United States Patent
Ghorishi et al.

(10) Patent No.: US 7,952,992 B1
(45) Date of Patent: May 31, 2011

(54) PROCEDURE AND MECHANISMS FOR CONTROL AND BEARER REDUNDANCY OF TDM-BASED SERVICE PROVIDER CONNECTIONS

(75) Inventors: Roozbeh Ghorishi, Sudbury, MA (US); David S. Holland, Rutland, MA (US); William Melaragni, Billerica, MA (US); Wayne Bortman, Shrewsbury, MA (US); Kenneth J. O'Connor, III, Bedford, MA (US)

(73) Assignee: Avaya Inc., Basking Ridge, NJ (US)

( * ) Notice: Subject to any disclaimer, the term of this patent is extended or adjusted under 35 U.S.C. 154(b) by 1514 days.

(21) Appl. No.: 11/344,430

(22) Filed: Jan. 31, 2006

(51) Int. Cl.
*G01R 31/08* (2006.01)

(52) U.S. Cl. ........ 370/220; 361/788; 370/225; 370/242; 439/61; 439/607.05; 710/301; 714/2; 714/712

(58) Field of Classification Search .......... 379/399.01–413.04; 370/217, 220, 252, 242; 714/4, 712

See application file for complete search history.

(56) References Cited

U.S. PATENT DOCUMENTS

| | | | | |
|---|---|---|---|---|
| 5,329,579 | A * | 7/1994 | Brunson | 379/88.26 |
| 6,125,448 | A * | 9/2000 | Schwan et al. | 713/300 |
| 6,351,452 | B1 * | 2/2002 | Koenig et al. | 370/217 |
| 6,449,249 | B1 * | 9/2002 | Cloonan et al. | 370/217 |
| 6,546,617 | B1 * | 4/2003 | Hayashi et al. | 29/825 |
| 6,549,617 | B1 * | 4/2003 | Abreu et al. | 379/93.24 |
| 2002/0034194 | A1 * | 3/2002 | Young et al. | 370/498 |
| 2002/0078395 | A1 * | 6/2002 | Wachel | 714/4 |
| 2004/0151163 | A1 * | 8/2004 | Jang | 370/352 |

FOREIGN PATENT DOCUMENTS

WO   WO 2006/040354   * 10/2005

\* cited by examiner

*Primary Examiner* — Fan Tsang
*Assistant Examiner* — Ibraham Sharifzada
(74) *Attorney, Agent, or Firm* — Chapin IP Law, LLC; David W. Rouille, Esq.

(57) ABSTRACT

In a media gateway, a single RTM is placed in bi-directional communication with a active TPM and also in bi-directional communication with a backup TPM. This is accomplished in part by implementation of a signaling and control bus interface between the LIU/Framer hardware of the RTM and the control processing unit (CPU) of the TPM. This interface provides for arbitration between multiple control sources, and for snooping of the input connection state and signaling information between the LIU/Framer and any other control entity. The interface also prevents contention by multiple control sources driving signal information to the LIU/Framer device.

13 Claims, 3 Drawing Sheets

PROCEDURE AND MECHANISMS FOR CONTROL AND BEARER REDUNDANCY OF TDM-BASED SERVICE PROVIDER CONNECTIONS

BACKGROUND

A switch (sometimes referred to as a gateway) is used to supply Public Switched Telephone Network (PSTN) connectivity through a plurality of interfaces, the interfaces including T1, T3, E1, E3, DS1, DS3, analog ports and the like. Within the gateway, the physical network interfaces are terminated on a Rear Transmission Module (RTM) while the processing function is implemented by Trunk Processing Modules (TPMs).

Redundancy schemes may be implemented for certain applications involving a media gateway. "N+1" means that there is one, and only one, redundant element for N active elements. If one element fails then it is replaced by the spare ("+1") element. If two active elements fail, there is a degradation of service because only one of these elements has been replaced. "N:1" means that there are N active elements, any of which can communicate to the "1" at any time. In the latter case, an N:1 system can be made to look like an N+1 system, but an N+1 system can never function as a N:1 system.

Current designs provide a fixed 1 to 1 mapping between the Line Interface Unit (LIU)/Framer hardware inserting and extracting signaling and control information on the service connection and the local CPU driving that hardware. This design requires relays and/or analog switches to switch between redundant line cards and/or logic in redundant LIU/Framer devices. Current solutions use a relay (or equivalent) switching mechanism to protect the layer 1 transmission connection between two T-Carrier switches.

SUMMARY

Conventional mechanisms such as those explained above suffer from a variety of deficiencies. The mechanical relays and analog switches traditionally used in 1+1 protection applications have many disadvantages that include additional component cost, PCB real estate cost, inferior reliability and slow switching times that can cause frame hits. All these issues are compounded as the number of channels increase and as the number of boards increase. In high-density systems, the card height could be reduced substantially if the relays were not needed.

Another deficiency associated with conventional mechanisms relates to impedance mismatches. When attempting to avoid the use of relays to control termination impedances, the designer finds that if a single span is properly terminated with both a active and backup card present, it is mismatched when one of those cards is removed. Likewise, if that same span is properly terminated when only the active card is inserted, a mismatch occurs once the backup card is inserted. Also, in many redundancy designs, two line cards share a common interface card where the connector and transformer are located. The designer would like to run the data path across the backplane (or through a midplane) and into the two terminated line cards, but this causes an impedance mismatch as well.

Hot Swapping and reconfigurability have also been difficult to provide in conventional mechanisms. Hot swapping refers to a system not experiencing errors when either the active card or backup card is inserted or removed. Hot swapping is achievable by maintaining a true tri-state condition regardless of power cycling and line loading. Reconfigurability refers to the ability to reconfigure a device on the fly for various data rates without a PCB change. T1/E1/J1 and DS3/E3/STS-1 are two common sets of data rates needed for TDM transport applications. The designer has to typically change external components for termination as well as for the clock rates needed for these various rates.

In systems which use a relay (or equivalent) switching mechanism to protect the layer 1 transmission connection between two T-Carrier switches, the mechanisms provide redundant connectivity, but require the added expense of redundant Line Interface Units (LIU)/Framer and/or the expense of redundant carrier connections. In addition this binding enforces control and management portioning defined by the LIU/Framer capacity, and sets the scaling increments accordingly.

In conventional mechanisms, an RTM was placed in bi-directional communication with only a single TPM or was placed in bi-directional communication with a single TPM and in unidirectional communication with another TPM.

Embodiments of the invention significantly overcome such deficiencies and provide mechanisms and techniques that provide procedures and mechanisms for control and bearer redundancy of TDM-based service provider connections. A media gateway includes a midplane bus between the TPM and the RTMs such that the hardware control interface is decoupled from the control plane CPU directly responsible for managing it. This allows comparable reliability at considerably reduced cost.

By way of the present invention a single RTM is placed in bi-directional communication with a active TPM and also in bi-directional communication with a backup TPM. This is accomplished in part by implementation of a signaling and control bus interface between the LIU/Framer hardware of the RTM and the control processing unit (CPU) of the TPM. This interface provides for arbitration between multiple control sources, and for snooping of the input connection state and signaling information between the LIU/Framer and any other control entity. The interface also prevents contention by multiple control sources driving signal information to the LIU/Framer device An additional advantage achieved by the present invention is the ability to split control of an LIU/Framer between multiple CPUs allowing finer granularity in resource scaling. By decoupling the LIU/Framer and its control processor, less expensive systems of comparable reliability providing "hot" standby redundancy may be built.

A particular embodiment of a system includes at least one Rear Transmission Module (RTM), a bus in communication with said at least one RTM, and a plurality of Trunk Processor Modules (TPMs) in communication with the bus, wherein at least two of the TPMs are in bi-directional communication with a single RTM via the bus.

Other arrangements of embodiments of the invention that are disclosed herein include software programs to perform the embodiment steps and operations summarized above and disclosed in detail below. More particularly, a computer program product is one embodiment that has a computer-readable medium including computer program logic encoded thereon that when performed in a system provides associated operations providing procedures and mechanisms for control and bearer redundancy of TDM-based service provider connections as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A switch (sometimes referred to as a gateway) is used to supply Public Switched Telephone Network (PSTN) connectivity through a plurality of interfaces, the interfaces including T1, T3, E1, E3, DS1, DS3, analog ports and the like. Within the gateway, the physical network interfaces are terminated on a Rear Transmission Module (RTM) while the processing function is implemented by Trunk Processing Modules (TPMs). A TPM may also be referred to as a Trunk Interface Module (TIM) and the terms TPM and TIM are used interchangeably herein. The RTM is able to provide a redundancy and availability infrastructure by abstracting the data from the line interfaces into a common transport. Specifically, the TDM nature of each is link is abstracted to the H.110 format. Similarly, the signaling nature of each link is abstracted to the PBI format. Even though the framing, data rates, and protocols are different across the many links, they are converted into common formats.

Figure 1:
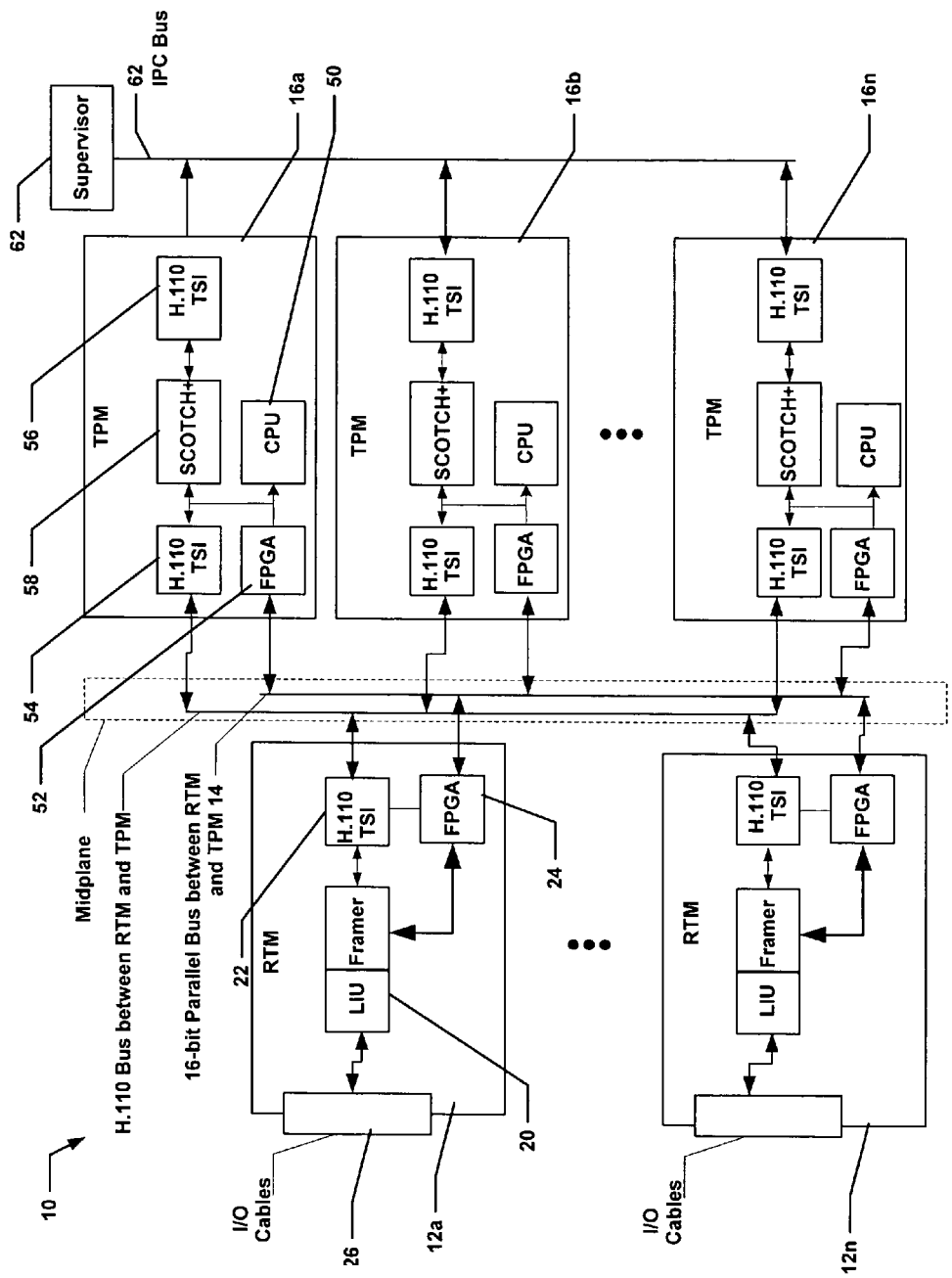
FIG. 1 illustrates an example computer system architecture for a computer system that provides for control and bearer redundancy of TDM-based service provider connections in accordance with embodiments of the invention.
Figure 2:
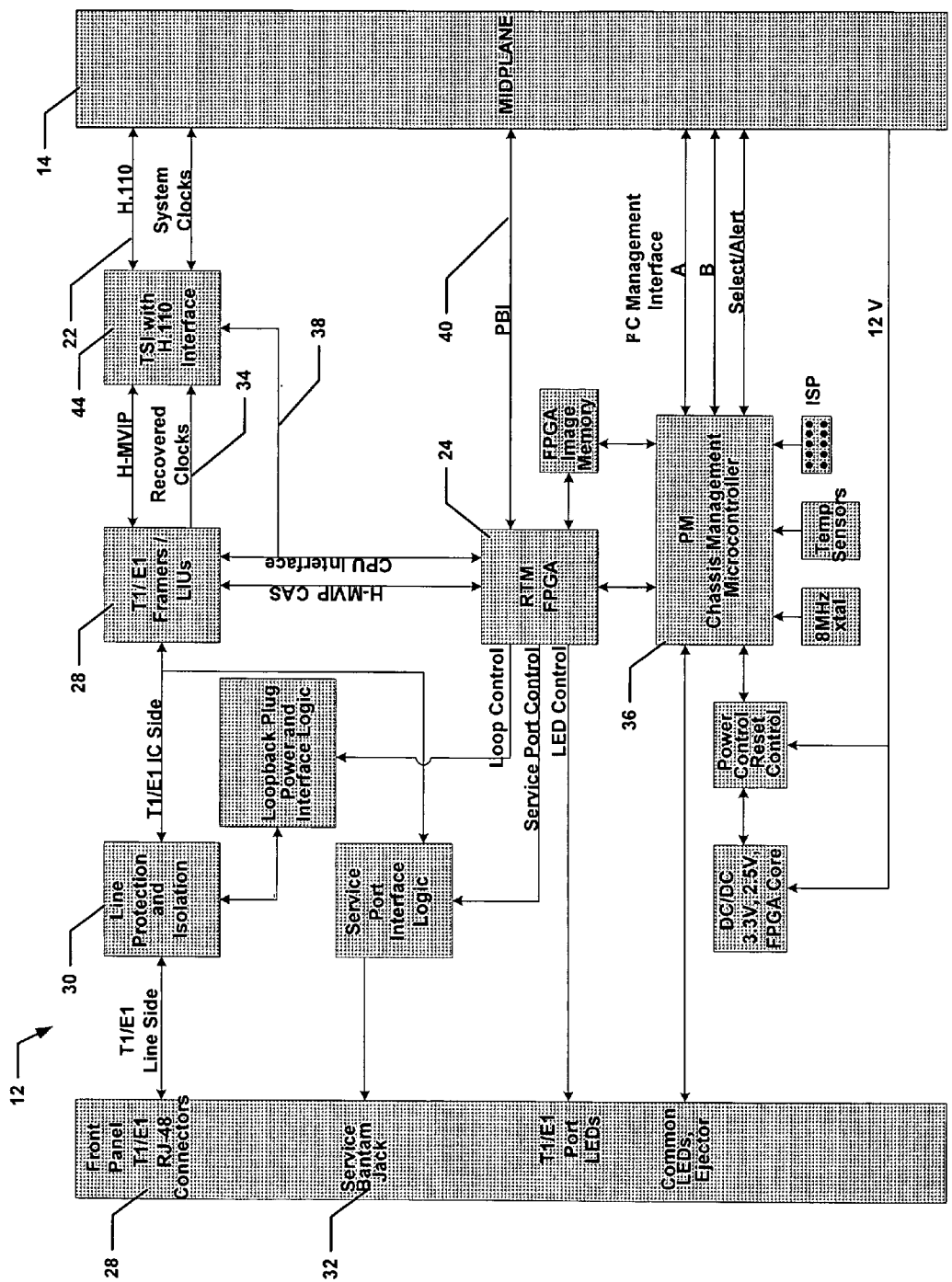
FIG. 2 comprises a block diagram of a particular embodiment of an RTM module.
Figure 3:
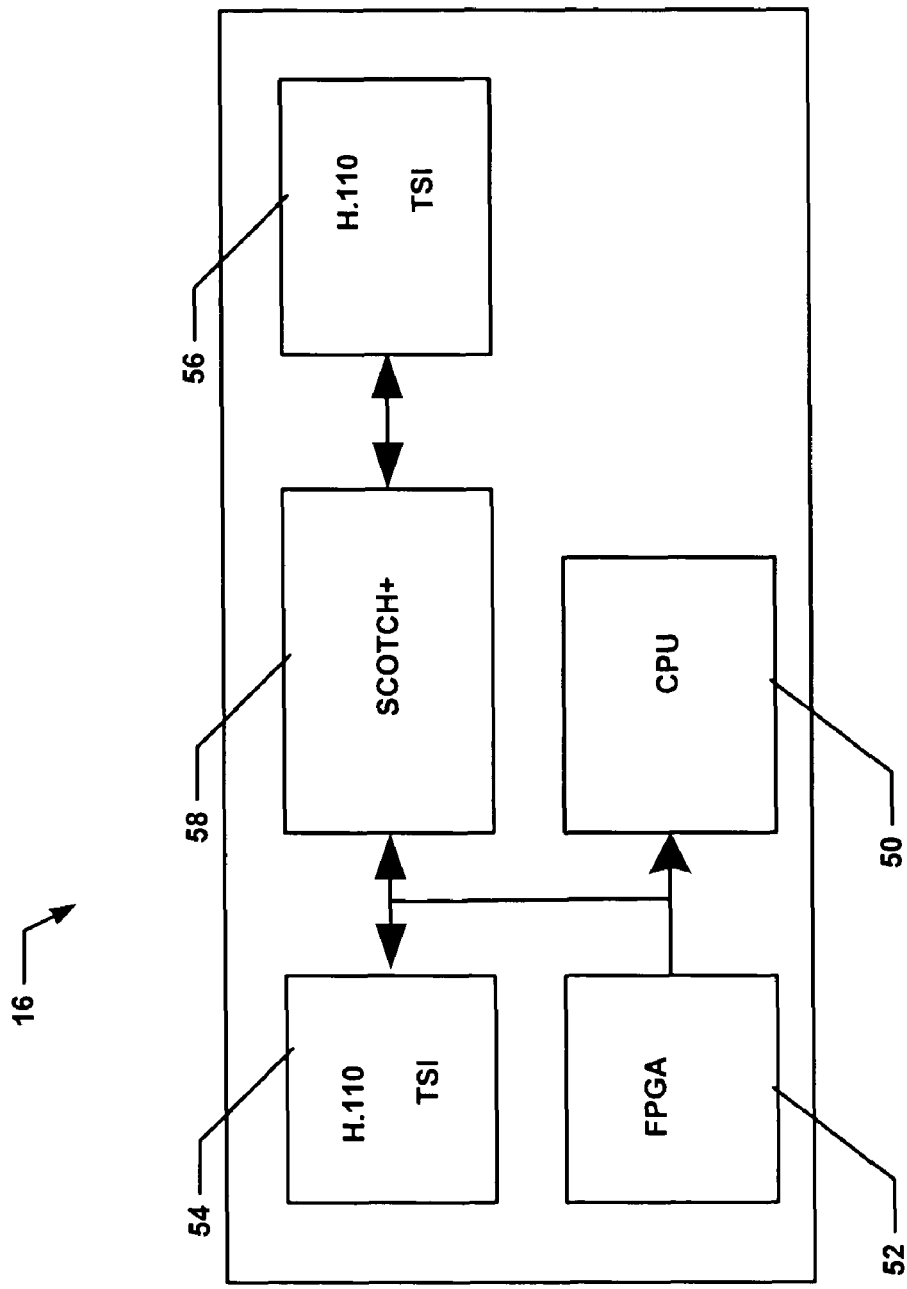
FIG. 3 comprises a block diagram of a particular embodiment of an TPM module.

In a particular example, as shown in FIG. 1 and FIG. 2, the T/E-Carrier RTM modules 12a through 12n each include a Line Interface Unit (LIU)/Framer 20 interfaced to I/O cable connectors 26, a Time Slot Interchange (TSI) 22 in communication with the LIU/Framers and also connected to the H.110 bus, and an FPGA 24 in communication with the LIU/Framers and interfaced to a midplane bus.

TPM modules 16a through 16n each include a local CPU 50, an FPGA 52, a pair of TSIs 54 and 56 connected to the H.110 bus and a Switch Conferencor for TDM bus and Concentration Highway (SCOTCH+) device 58. The CPU 50 is responsible for configuring the chips on the RTM 12a-12n and for the layer 1+ processing of the T/E-Carrier signaling information. Due to the vast amount of signaling data, and the slow and indirect access method required of the framers, the CPU 50 may be unable to keep up in a DS3 environment. Therefore the Field Programmable Gate Array (FPGA) 24 is used to offload the CPU 50. The FPGA 24 automatically takes care of extracting the signaling information from the framers, and shipping them off in a burst transfer to the TPM. Likewise, the FPGA off loads the CPU by bursting the signaling data to the RTM.

On the RTM 12a through 12n, the FPGA 24 continuously plays-out the signaling to the framers, even during a TPM failure. In addition, the FPGA 24 provides a slave interface for the remote TPM to access the device registers on the RTM.

RTM Signaling is broadcasted onto the common bus 14. This allows a standby TPM 16a-16n to snoop the signaling for providing N:1 redundancy. The RTM 12a will master the bus to push the signaling data across in bursts thus removing inefficiencies of reads and short accesses. The RTM 12a through 12n maintains previous state. If no data is received, old data will be sent in case of a TPM failure. The data written by the active TPM (e.g., TPM 16a) can be read by a standby TPM (e.g., TPM 16b) to assist in establishing state during a failover. Redundant busses are provided in case of a defect such as a bent pin. Built-in monitoring of redundant busses is performed in order to offload the CPU. Additionally, parity protection of external busses is provided.

Self-configuring base address windows are used, therefore any need for PCI like configuration writes is removed. A built-in central based arbiter is also implemented for arbiter redundancy. The TPM's CPU 50 is offloaded by providing automatic and continuous DMA read requests from local CPU or local memory with programmable inter-burst delays. These bursts are then automatically DMA'd to the remote RTM. Full error and statistics gathering is also provided.

The RTMs and TPMs share a common parallel bus 14 for transfer of control at rates up to 128 Mbps. The interface allows any RTM 12a-12n, appropriately configured, to communicate with any TPM 16a-16n. For redundancy, there are two Parallel Bus Interfaces (PBI's) on the midplane. This prevents Single Points of Failure (SPOF) such as a bent pin on an RTM connector from bringing down the entire system. Only one PBI is active at any time. In this example, the PBI includes 16 bi-directional muxed address/data lines, a Data valid line input, a clock input, a bi-directional parity line, a bi-directional error line, three PBI select line inputs, and an Arbitration request/bus busy line.

1:N redundancy is provided between at least two TPMs and an RTM. For example, RTM 12a may be in bi-directional communication with both TPM 16a and TPM 16b. TPM 16a is the active TPM and TPM 16b is the standby or backup TPM. In the event TPM 16a fails, TPM 16b can take over as the active TPM, thus preventing an interruption in processing.

The TI/EI RTM is a Trunk Rear Transition Module able to support either 4 or 8 TI/EI ports 28. The RTM will transport the bearer data to a TPM over an H.110 bus 22. An FPGA 24 on the RTM collects the CAS (signaling) bits from the framer 28 and presents them to the TPM CPU 50.

The TI/EI circuitry uses Line Interface Units (LIUs)/ Framer 20. Line protection circuitry 30 is provided to meet the inter-building lightning and power cross immunity requirements of GR-1089 and FCC Part 68. The RTM also contains a Peripheral Management node 36. This block is of common design and resides on RTMs as well as TPMs. The chassis management infrastructure is primarily used to control the power up and power down processes of the card. Service specific functions are also provided on the RTM. A Service Port 32 is provided for monitoring any one of the eight T1/E1 ports. The ability to supply phantom power to a service loop backjack is also provided.

The RTM uses a digital switch (also referred to as a TSI) 44 which provides switching capacities of 4,096×1,024 channels between backplane and local framers. The device 44 has features that are programmable on a per-stream or a per-channel basis including message mode, input delay offset, output advancement offset, and direction control. The digital switch 44 uses an H.110 interface. This H.110 is designated as the RTM H.110 22 and is designed to carry data between RTM modules and TPM payload modules. All DS0s from the framers pass through digital switch 44. A TSI function is performed on each DS0, mapping them to or from the appropriate slot on the H.110 bus.

The digital switch 44 receives one recovered line clock 34 from each of the two framers. These can be driven to either midplane network reference clock line. The supervisor 62 provides an 8.192 MHz clock and frame sync over the midplane for H.110 bus timing.

The digital switch 44 has a Joint Test Action Group (JTAG) interface which is used for manufacturing test, and also provides a parallel non-multiplexed bus microprocessor interface 38. This interface is connected to the RTM FPGA 24. TPM CPU 50 access to the internal registers is done via the FPGA, which is connected to the PBI bus 40. The microprocessor interface 38 is compatible with non-multiplexed bus structures. The microprocessor signals include the 16-bit data bus (D15-D0), 14-bit address bus (A13-A0) and 4 control lines (CS, DS, R/W and DTA). The microprocessor port provides access to the internal registers, the connection and data memories. All locations provide read/write access except for the Local and Backplane Bit Error Rate registers (LBERR and BBERR) and Data Memory, which can only be read.

The RTM H.110 22 is designed to carry data between RTM modules and TPM payload modules. One purpose of the H.110 interface devices is to provide time slot interchanging between the H.110 bus and the local TDM bus. There are 4,096 time slots on the H.110, 32 of which are reserved by the chassis for H.110 integrity checking. The remaining time slots are capable of being mapped to any arbitrary time slot on the local TDM bus.

The block diagram in FIG. 1 presents a high-level, hardware oriented, architectural view of a particular embodiment of the major components involved in processing trunk calls and analog station calls in the media gateway. The trunk processing system 10 includes analog and digital trunk interface RTM modules 12a through 12n, and a payload TPM module 16a that manages them. Control and bearer traffic pass between the TPM and RTM modules via a 16-bit Parallel Bus Interface (PBI) 14 and 4096 timeslot H.110 bus respectively.

The TPM software is able to support a scaleable number of T1 or E1 spans. In a particular embodiment, the TPM software scales to handle a maximum of 32 T1 or E1 spans. This is achieved with a configuration of a single TPM controlling 4 octal T1/E1 RTMs. In the case of the DS3 RTM, 28 DS1 spans are supported. Alternatively, the DS3 framer on the DS3 RTM can be configured to multiplex 21 E1 streams. In both cases, the framer provides a total of 672 DS0 channels.

The media gateway separates the physical interfaces from the processing elements. This is accomplished by placing the line interface and framer components on a RTM module, and the processing elements such as conferencing engines and echo cancellation resources on a payload TPM module.

The main CPU on the TPM manages devices on the RTM modules via the PBI bus. Moreover, the arrangements of FPGAs on the various RTM and TPM modules allow a single TPM to control up to 4 digital RTMs and 2 analog RTMs. Bearer traffic is transported between the RTM and TPM modules over the RTM H.110 Bus.

Because of the decoupling of the I/O elements, the TPM software acts as a proxy for all of the DS1, DS3 and analog interfaces under its control. Configuration and maintenance control channel messages are addressed to the physical interface itself, or channels within that physical interface. Based on an RTM-TPM binding established automatically or manually via system management, these messages are forwarded by the Media gateway supervisor to the controlling TPM, where they are processed. The TPM takes appropriate actions on behalf on the physical interfaces under its control.

The media gateway replaces the traditional TDM bus based control channel with a 100Base-TX Ethernet Inter-Processor Communication) IPC bus. This high-speed control channel eliminates the real time constraint imposed upon port boards and media modules that interfaced with TDM bus based control channel. A socket connection for the supervisor and the TPM is established over the IPC bus for communication between the two entities.

Additionally, a TPM may establish a socket connection to a second TPM within the same chassis to support the gateway high availability model.

The media gateway replaces the traditional 8 bit parallel TDM busses with a H.110 payload TDM bus. This H.110 bus carries bearer traffic between payload modules in the gateway chassis, and is composed of 32 separate 128 timeslot serial busses, each operating at 8.192 Mbps, for a total of 4096 timeslots. This larger capacity is necessary to support the higher trunk densities available in a media gateway in a non-blocking manner. A separate H.110 bus is used to transport DS0 bearer traffic between the RTMs and the controlling TPM across the midplane.

The control plane software is responsible for timeslot management on the TDM busses. Network update messages are required to handle the change in the number of timeslots and/or busses (the H.110 bus can be viewed as a single bus with 4096 timeslots, or as 32 busses with 128 timeslots apiece). The control plane software will use these new messages to manage timeslots on the RTM H.110 bus, as well as the payload H.110 bus. The TPM software must parse and process these new messages accordingly. Additionally, both the TPM and RTM modules are involved in verifying the integrity of the 2 H.110 busses.

The media gateway supports the notion of high availability primarily through redundant components. The TPM supports the 1+1 redundancy model. The supervisor 62 informs the TPM whether it is the Active or Standby module. Both modules receive stimuli from the call controller and gateway supervisor via the IPC channel 60, and from the network interface via the RTM FPGA. The IPC 60 is the path for TPM and management lane coordination of synchronization, discussed in detail below. The Active TPM module processes all stimuli to completion; however, in Standby mode, the TPM software takes care not to perform any action that would directly alter the RTM framer's mode of operation or transmit data onto either the payload or RTM H.110 busses.

The Standby TPM module is in a position to assume the Active role upon detection of a failure of the Active TPM module with calls preserved and no user perceptible loss of service. A call preserving failover of TPM modules take place if the Active and Standby TPM modules are state synchronized. For scenarios when the Standby TPM is brought into service at a later point in time, the Standby TPM module has the ability to synchronize its configuration and state from the Active TPM module. Audits may be utilized to guarantee the integrity of the synchronicity between Active and Standby modules. The gateway supervisor 62 has the ability to determine an Active/Standby pair's synchronicity state so it knows when a call preserving failover can take place.

The network clocking architecture in the media gateway is slightly different than those found in the traditional media gateways. Under the control of the supervisor, the TPM is instructed to drive at most one recovered clock from any one of the digital trunk interfaces under its control onto the midplane. This clock signal is used as a reference clock for the rest of the system. To support the gateways goals of high availability and no SPOF, this reference clock is redundant on the midplane. This differs from the port network and media gateway network clocking architectures where both a active and a secondary reference clock are present on the backplane simultaneously. The architectural change forces the supervisor to play a more active role during a clock failover. When this occurs, the supervisor instructs the TPM to stop driving the clock from the faulty trunk interface and start driving the recovered clock from a second digital trunk interface onto the midplane.

The TPM software is written to manage a scaleable number of DS1 facilities, up to a maximum of 32. Along with the management of multiple DS1 spans, the TPM software concurrently manages at most one DS3 span, and up to 16 analog ports (8 lines and 8 trunks). Depending upon whether or not a TPM is bound to a DS3 RTM or analog RTMs, the DS3 and analog specific software on the TPM may or may not execute.

In order to support the high availability requirements described above, the time in which the gateway detects hardware and software failures is on the order of one second. In current products, this same detection occurs on the order of tens of seconds.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A system comprising:
    at least one Rear Transmission Module (RTM);
    a midplane bus in communication with said at least one RTM;
    a plurality of Trunk Interface Modules (TPMs) in communication with said midplane bus, wherein at least two of said TPMs are in bi-directional communication with a single RTM via said midplane bus, wherein a first one of said at least two TPMs in bi-directional communication with a single RTM comprises an active TPM, wherein a second one of said at least two TPMs in bi-directional communication with a single RTM comprises a standby TPM, wherein said midplane bus includes a primary bus providing a communication path between said RTM and said active TPM and wherein said midplane bus further includes a backup bus providing a communication path between said RTM and said standby TPM, wherein said RTM signaling is broadcast on said backup bus allowing said standby TPM to snoop the signaling in order to provide redundancy for said active TPM; and
    a supervisor in communication with said plurality of TPMs, wherein said supervisor maintains synchronization between said active TPM and said standby TPM such that when said active TPM fails, said standby TPM takes over processing for the failed TPM.

2. The gateway system of claim 1 wherein said midplane bus further includes a H.110 bus providing a communication path between said RTM, said active TPM and said standby TPM.

3. The gateway system of claim 1 further comprising a IPC bus providing a communication path between said plurality of TPMs and said supervisor.

4. The gateway system of claim 1 wherein said standby TPM assumes a role of active TPM upon detection of a failure of said active TPM.

5. The gateway system of claim 2 wherein said RTM comprises:
    a front panel connector capable of providing Public Switched Telephone Network (PSTN) connectivity;
    a Line Interface Unit (LIU)/framer in communication with said front panel connector;
    a Time Slot Interchange (TSI) including a H.110 interface, said TSI in communication with said LIU/framer and also capable of communication with said H.110 bus of said midplane bus; and
    a Field Programmable Gate Array (FPGA) in communication with said LIU/framer and capable of communication with said primary bus and said standby bus of said midplane bus.

6. The gateway system of claim 5 further comprising a service port in communication with said LIU/framer and said front panel connector.

7. The gateway system of claim 1 wherein said RTM is hot swappable.

8. The gateway system of claim 1 wherein a first one of said plurality of TPM modules comprises:
    a first Time Slot Interchange (TSI) including a H.110 interface capable of communicating with said H.110 bus of said midplane bus;
    a Field Programmable Gate Array (FPGA) in communication with said first TSI and capable of communication with said primary bus and said standby bus of said midplane bus; and
    a Control Processing Unit (CPU) in communication with said first TSI and said FPGA.

9. The system of claim 1 wherein data written to said active TPM is read by said standby TPM to establish state during a failover.

10. The system of claim 1 wherein RTM signaling is broadcast on a common bus to allow said standby TPM to snoop said signaling in order to provide N:1 redundancy.

11. The system of claim 1 wherein data written by said active TPM is read by said standby TPM to assist in establishing state during a failover.

12. The gateway system of claim 1 wherein data written by said active TPM can be read by said standby TPM.

13. The gateway system of claim 8 wherein said FPGA provides a slave interface for a remote TPM to access device registers of said RTM.

* * * * *